United States Patent
Davis, III et al.

(10) Patent No.: US 10,577,957 B2
(45) Date of Patent: Mar. 3, 2020

(54) AFT FRAME ASSEMBLY FOR GAS TURBINE TRANSITION PIECE

(71) Applicant: General Electric Company, Schenectady, NY (US)

(72) Inventors: Charles Lewis Davis, III, Simpsonville, SC (US); David Kenton Felling, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 314 days.

(21) Appl. No.: 15/783,356

(22) Filed: Oct. 13, 2017

(65) Prior Publication Data

US 2019/0112937 A1 Apr. 18, 2019

(51) Int. Cl.
 *F01D 9/06* (2006.01)
 *F02C 3/04* (2006.01)
 *F01D 11/00* (2006.01)

(52) U.S. Cl.
 CPC ............ *F01D 9/065* (2013.01); *F01D 11/003* (2013.01); *F02C 3/04* (2013.01)

(58) Field of Classification Search
 CPC ........ F01D 9/023; F01D 9/065; F01D 11/003; F01D 25/08; F01D 25/24; F01D 25/28; F02C 3/04
 See application file for complete search history.

(56) References Cited

U.S. PATENT DOCUMENTS

| | | | |
|---|---|---|---|
| 6,412,268 B1 * | 7/2002 | Cromer | F01D 9/023 60/760 |
| 6,769,257 B2 * | 8/2004 | Kondo | F01D 9/023 60/730 |
| 8,245,515 B2 | 8/2012 | Davis | |
| 8,499,566 B2 | 8/2013 | Lacy | |
| 8,651,805 B2 | 2/2014 | Lacy | |
| 8,707,705 B2 * | 4/2014 | Berry | F01D 9/023 60/39.83 |
| 8,956,104 B2 | 2/2015 | Lacy | |
| 9,255,484 B2 * | 2/2016 | Cihlar | F01D 9/023 |
| 9,297,262 B2 | 3/2016 | Zhang | |
| 9,574,498 B2 * | 2/2017 | Fadde | F02C 7/141 |

(Continued)

FOREIGN PATENT DOCUMENTS

WO 2017105405 A1 6/2017

*Primary Examiner* — Carlos A Rivera
(74) *Attorney, Agent, or Firm* — Charlotte C. Wilson; James W. Pemrick

(57) ABSTRACT

An aft frame assembly for a gas turbine transition piece has a main body with an upstream facing surface and downstream facing surface. Feed hole inlets are located on the upstream facing surface, and each feed hole inlet is coupled to a cooling channel that passes through the main body towards the downstream facing surface. Plenums are located in or near the downstream facing surface. Each cooling channel is connected to and terminates in a plenum. Microchannels are formed in or near the downstream facing surface, and each microchannel is connected to a plenum. The cooling channels are configured as inputs and the microchannels are configured as outputs of the plenums. Two or more of the cooling channels and two or more of the microchannels are connected to one plenum. Exit channels are connected to the microchannels, and exhaust flow out of an upstream facing surface of a seal slot.

20 Claims, 9 Drawing Sheets

(56) References Cited

U.S. PATENT DOCUMENTS

| | | | |
|---|---|---|---|
| 2015/0118033 A1* | 4/2015 | Smith | F01D 25/12 |
| | | | 415/175 |
| 2015/0369068 A1* | 12/2015 | Kottilingam | B22F 7/08 |
| | | | 415/116 |
| 2018/0100436 A1* | 4/2018 | DiCintio | F01D 9/023 |
| 2019/0112936 A1* | 4/2019 | Davis, III | F01D 9/065 |
| 2019/0112943 A1* | 4/2019 | Davis, III | F01D 25/12 |
| 2019/0113230 A1* | 4/2019 | Simmons | F02C 7/18 |

* cited by examiner

AFT FRAME ASSEMBLY FOR GAS TURBINE TRANSITION PIECE

BACKGROUND OF THE INVENTION

The apparatus described herein relates generally to aft frame assemblies, and more specifically, to an aft frame assembly for a transition piece of a gas turbine where the aft frame assembly includes plenum chambers in fluid communication with microchannel cooling slots.

Turbine systems are widely utilized in fields such as power generation. For example, a conventional gas turbine system includes a compressor, a combustor, and a turbine. In a conventional gas turbine system, compressed air is provided from the compressor to the combustor. The air entering the combustor is mixed with fuel and combusted. Hot gases of combustion flow from the combustor to the turbine to drive the gas turbine system and generate power.

In a typical arrangement, an annular array of combustors is connected to the first stage of the turbine by a plurality of transition pieces. The transition pieces are each shaped at one end to conform to respective combustor liners, and at an opposite end to conform to the inlet of the turbine. Thus, at the opposite (or downstream) end, a transition piece has an aft frame by which the transition piece is secured to the turbine. An impingement sleeve may surround the transition duct, and may be used to direct working fluid discharged from the compressor into contact with the transition piece. This working fluid eventually mixes with the fuel in the combustor.

Currently, some of the working fluid that enters the flow path between the transition piece and the surrounding impingement sleeve is removed through holes in the aft frame. This working fluid, which is used to cool the aft frame, dumps into the hot gas from the combustor just before the hot gas enters the turbine. The problem with this current cooling method is that this working fluid does not always reach the areas of the aft frame that need to be cooled.

BRIEF DESCRIPTION OF THE INVENTION

In an aspect of the present invention, an aft frame assembly for a gas turbine transition piece is provided. The aft frame assembly includes a main body comprising an upstream facing surface, a downstream facing surface and a seal slot. A plurality of feed hole inlets are located on the upstream facing surface, and each of the feed hole inlets is coupled to one of a plurality of cooling channels that pass through the main body towards the downstream facing surface. A plurality of plenums are located in or near the downstream facing surface, and each of the plurality of cooling channels are connected to and terminate in one or at least one of the plenums. The cooling channels are configured as inputs to the plenums. A plurality of microchannels are formed in or near the downstream facing surface, and each of the plurality of microchannels is connected to one of the plenums. The microchannels are configured as outputs of the plenums. Two or more of the cooling channels and two or more of the microchannels are connected to one of the plenums. A plurality of exit channels are connected to the microchannels, and the exit channels are configured to exhaust flow out of an upstream facing surface of the seal slot or exhaust flow out of one or more exhaust slots formed in a side rail of the aft frame assembly.

In another aspect of the present invention, a transition piece assembly has an aft frame assembly. The aft frame assembly includes a main body with an upstream facing surface, a downstream facing surface and a seal slot. A plurality of feed hole inlets are located on the upstream facing surface, and each of the feed hole inlets is coupled to one of a plurality of cooling channels passing through the main body towards the downstream facing surface. A plurality of plenums are located in or near the downstream facing surface, and each of the plurality of cooling channels is connected to and terminates in at least one of the plenums. The cooling channels are configured as inputs to the plenums. A plurality of microchannels are formed in or near the downstream facing surface, and each of the plurality of microchannels is connected to one of the plenums. The microchannels are configured as outputs of the plenums. Two or more of the cooling channels and two or more of the microchannels are connected to one of the plenums. A plurality of exit channels are connected to the microchannels, and the exit channels exhaust flow out of an upstream facing surface of the seal slot.

In yet another aspect of the present invention, a gas turbine includes a compressor and a combustion section disposed downstream from the compressor. The combustion section is in fluid communication with the compressor. A turbine is disposed downstream from the combustion section, and the turbine is in fluid communication with the combustion section. The combustion section includes an aft frame assembly having a main body with an upstream facing surface, a downstream facing surface and a seal slot. The seal slot extends substantially circumferentially around the aft frame assembly. A plurality of feed hole inlets are located on the upstream facing surface. Each feed hole inlet is coupled to one of a plurality of cooling channels that pass through the main body towards the downstream facing surface. A plurality of plenums are located in or near the downstream facing surface. Each of the plurality of cooling channels is connected to and terminates in at least one of the plenums. The cooling channels are configured as inputs to the plenums. A plurality of microchannels are formed in or near the downstream facing surface. Each of the plurality of microchannels is connected to one of the plenums. The microchannels are configured as outputs of the plenums. Two or more of the cooling channels and two or more of the microchannels are connected to one of the plenums. A plurality of exit channels are connected to the microchannels, and the exit channels are configured to exhaust flow out of an upstream facing surface of the seal slot. The plurality of microchannels are covered by a cover member formed of a pre-sintered preform, or sheet metal, or an additively manufactured member.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component, and perpendicular to the radial direction.

Figure 1:
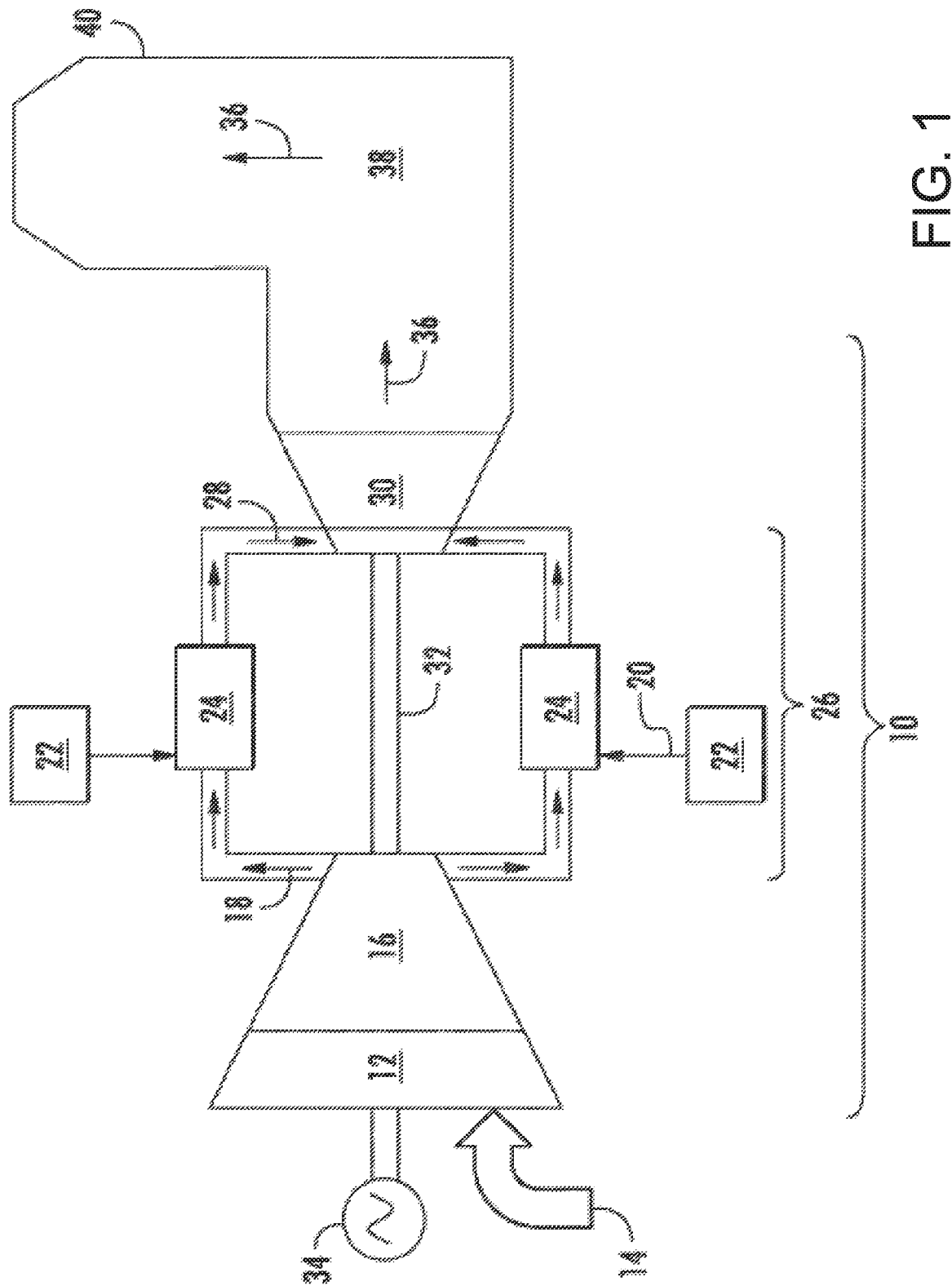
FIG. 1 is a functional block diagram of an exemplary gas turbine.

Referring now to the drawings, wherein identical numerals indicate the same elements throughout the figures, FIG. 1 provides a functional block diagram of an exemplary gas turbine 10 that may incorporate various embodiments of the present disclosure. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22 such as a fuel skid to form a combustible mixture within one or more combustors 24 of a combustion section 26 of the gas turbine 10. The combustible mixture is burned to produce combustion gases 28 having a high temperature, pressure and velocity. The combustion gases 28 flow through a turbine 30 of a turbine section to produce work. For example, the turbine 30 may be connected to a shaft 32 so that rotation of the turbine 30 drives the compressor 16 to produce the compressed working fluid 18.

Alternately or in addition, the shaft 32 may connect the turbine 30 to a generator 34 for producing electricity. Exhaust gases 36 from the turbine 30 flow through an exhaust section 38 that connects the turbine 30 to an exhaust stack 40 downstream from the turbine 30. The exhaust section 38 may include, for example, a heat recovery steam generator (not shown) for cleaning and extracting additional heat from the exhaust gases 36 prior to release to the environment.

Figure 2:
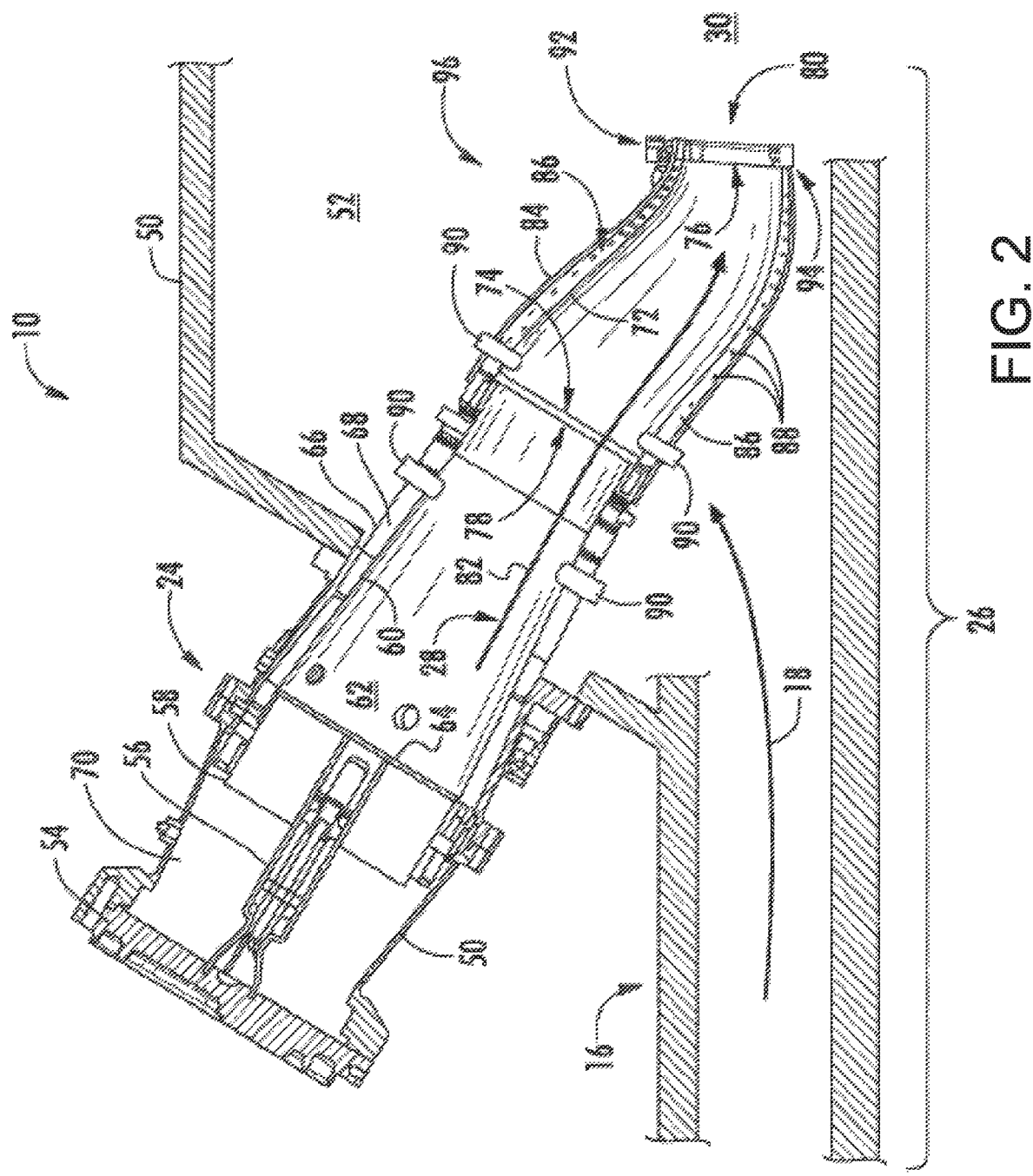
FIG. 2 illustrates a cross sectional side view of a portion of a gas turbine, including a combustor that may encompass various aspects of the present disclosure.

FIG. 2 provides a cross sectional side view of a portion of the gas turbine 10 including an exemplary combustor 24 as may be incorporated in various embodiments of the present invention. As shown in FIG. 2, the combustion section 26 includes an outer casing 50, such as a compressor discharge casing, disposed downstream from the compressor 16. The outer casing 50 at least partially surrounds the combustor 24. The outer casing 50 at least partially defines a high pressure plenum 52 that at least partially surrounds the combustor 24. The high pressure plenum 52 is in fluid communication with the compressor 16 so as to receive the compressed working fluid 18 from the compressor 16 during operation of the gas turbine 10.

An end cover 54 may be connected to the outer casing 50. In particular combustor designs, the end cover 54 is in fluid communication with the fuel source 22. A fuel nozzle 56 in fluid communication with the end cover 54 and/or the fuel source 22 extends downstream from the end cover 54. The fuel nozzle 56 extends generally axially through an annular cap assembly 58 disposed within the outer casing 50. An annular liner 60 such as a combustion liner or transition duct at least partially defines a combustion chamber 62 within the combustor 24 downstream from an outlet end 64 of the fuel nozzle 56. A flow sleeve 66 may circumferentially surround at least a portion of the liner 60. The flow sleeve 66 is radially separated from the liner 60 so as to define a flow passage 68 therebetween. The flow passage 68 is in fluid communication with the combustion chamber 62 via a head end portion 70 of the combustor 24. The head end portion 70 may be at least partially defined by the end cover 54 and/or the outer casing 50.

A transition duct (or transition piece) 72 extends downstream from the combustion chamber 62. The transition piece 72 includes an upstream end 74 that is axially separated from a downstream end 76. In particular configurations, the upstream end 74 surrounds a downstream portion 78 of the annular liner 60. The downstream end 76 of the transition piece 72 terminates proximate to an inlet 80 of the turbine 30. The annular liner 60 and/or the transition piece 72 at least partially define a hot gas path 82 for routing the combustion gases 28 from the combustion chamber 62 through the high pressure plenum 52 and into the turbine 30.

An outer sleeve 84 such as an impingement or flow sleeve extends circumferentially around the transition piece 72. The outer sleeve 84 is radially separated from the transition piece 72 to define a cooling annulus 86 therebetween. The outer sleeve 84 may include a plurality of cooling holes 88 or passages that provide for fluid communication between the high pressure plenum 52 and the cooling annulus 86. In one embodiment, the cooling annulus 86 is in fluid communication with the combustion chamber 62.

One or more fuel injectors 90, also commonly known as late lean fuel injectors, may extend through the outer sleeve 84, the cooling annulus 86 and the transition piece 72 to provide for fuel injection into the hot gas path 82 downstream from the combustion chamber 62. In addition or in the alternative, the fuel injectors 90 may extend through the flow sleeve 66, the flow passage 68 and the liner 60 to provide for fuel injection into the hot gas path 82 downstream from the combustion chamber 62. In addition or in the alternative, other penetrations such as cross fire tubes, igniters, pressure probes and flame detectors may act as bluff bodies within the flow annulus 86, thus creating disturbances to the flow such as wakes.

An aft frame assembly (or aft frame) 92 is disposed at or proximate to the downstream end 76 of the transition piece 72. The aft frame 92 is integral with the downstream end 76 of the transition piece 72. A portion of the outer sleeve 84 such as a forward edge 94 may be integral or connected to the aft frame 92 to at least partially define the cooling annulus 86. The aft frame 92 and the transition piece 72 may be manufactured as a singular component. In the alternative, the aft frame 92 may be connected to the transition piece 72 via welding, brazing or any other suitable process. In one embodiment, the transition piece 72, the outer sleeve 84, the cooling annulus 86 and the aft frame 92 are provided as a transition piece assembly 96. The aft frame 92 generally provides structural support to reduce and/or prevent deformation of the downstream end 76 of the transition piece 72 during operation of the combustor. In addition or in the alternative, the aft frame 92 may provide a means for mounting the transition piece 72 within the outer casing 50.

Figure 3:
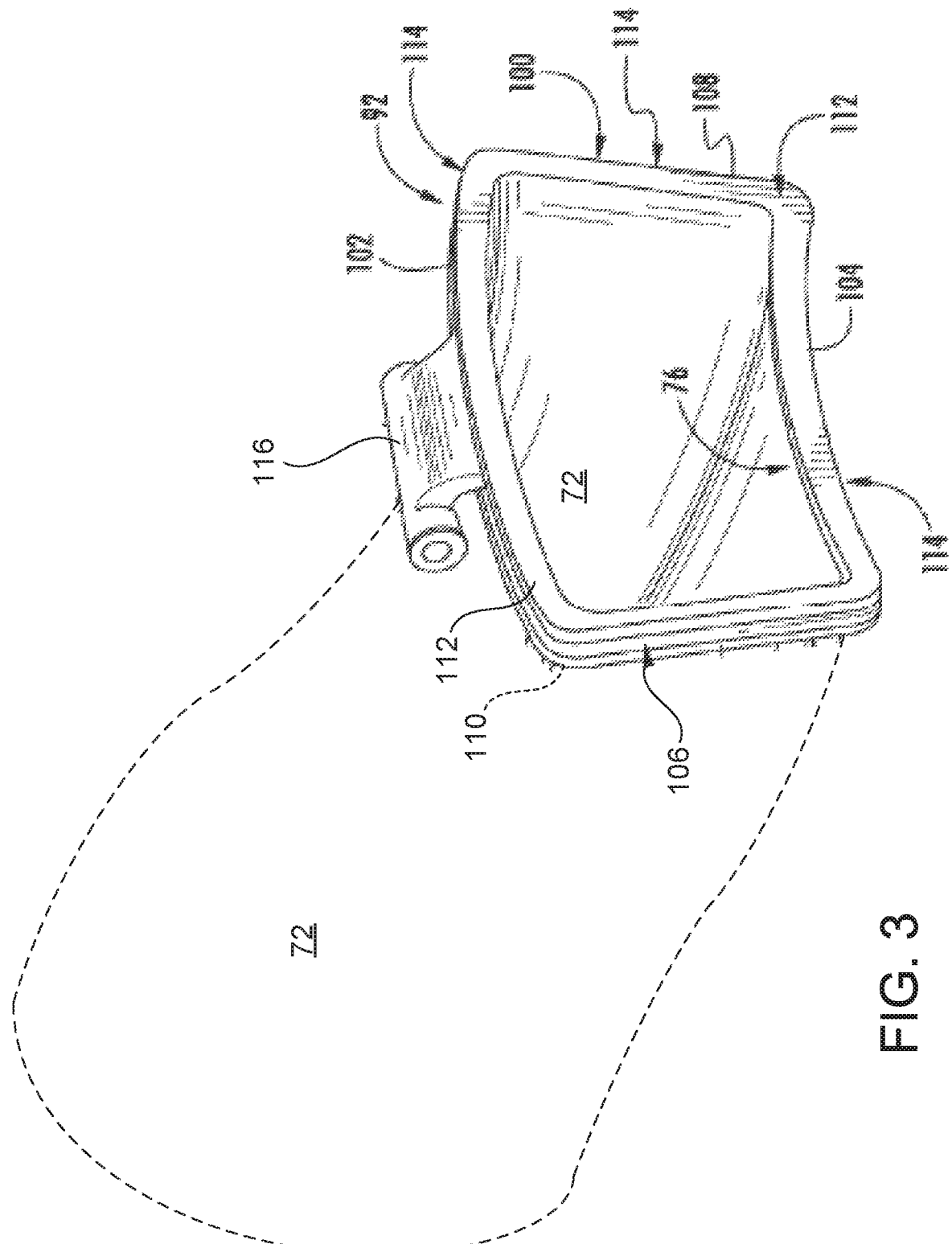
FIG. 3 illustrates a perspective view of an aft frame of the combustor as shown in FIG. 2, according to an aspect of the present disclosure.

As shown in FIG. 3, the aft frame 92 comprises a main body 100. The main body 100 includes an outer (or top) rail 102, an inner (or bottom) rail 104 and a first side rail 106 that is circumferentially separated from an opposing second side rail 108. The side rails are located on the sides of the aft frame, the outer rail is located on the top of the aft frame, and the inner rail is located on the bottom of the aft frame. Top rail 102 is located radially outward of bottom rail 104. The main body 100 further includes an upstream facing surface 110 (not visible in FIG. 3) separated from (and opposed to) a downstream facing surface 112, and an outer surface or surface 114 that extends around an outer perimeter of the main body 100 at least partially between the upstream facing surface 110 and the downstream facing surface 112. The aft frame 92 may also include a mounting feature 116 for the mounting transition piece 72 and/or the transition piece assembly 96 (FIG. 2) within the gas turbine 10.

The side rails of the aft frame have unique cooling needs due to the transition from a "can" combustor to an "annular" hot gas path where the inner and outer rails match up to the hot gas path. However, the side rails of the aft frame have no corresponding part in the hot gas path and therefore are exposed to hot gases more directly than the inner and outer rails.

Figure 4:
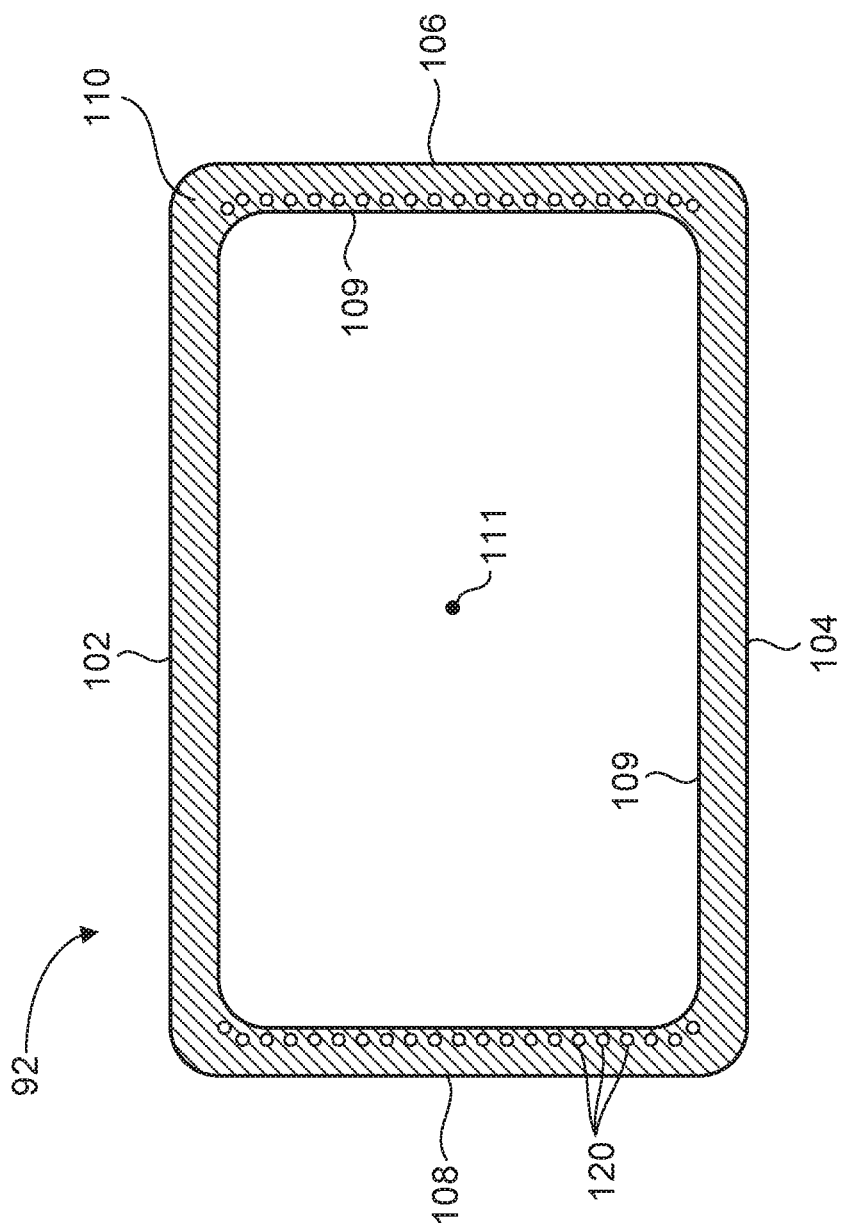
FIG. 4 illustrates a schematic view of the upstream facing surface of the aft frame assembly, according to an aspect of the present disclosure.

FIG. 4 illustrates a simplified, schematic view of the upstream facing surface 110 of aft frame 92, with the mounting feature 116 omitted for clarity. The upstream facing surface 110 includes a plurality of feed hole inlets 120 located thereon. Each of the feed hole inlets 120 is coupled to a cooling channel 122 that passes through the main body 100 and in a direction towards the downstream surface 112 (not shown in FIG. 4). For example, one feed hole inlet 120 functions as the beginning of a respective cooling channel 122, so a plurality of feed hole inlets 120 correspond to an equal number of cooling channels 122. The source of air input to the feed hole inlets 120 may be post-impingement cooling air drawn from between the transition piece 72 and the outer sleeve 84, which is otherwise referred to as cooling annulus 86. The specific locations or configuration of the feed hole inlets and cooling channels may be tailored to the specific application, so that thermal gradients in the aft frame are minimized or reduced. The radially inner surface 109 of the aft frame 92 is typically hotter than the radially outer surfaces 102, 104, 106, 108, so the feed hole inlets 120 and respective cooling channels 122 may be located nearer or close to the radially inner surface 109. The phrases "radially inner" and "radially outer" are used with respect to central origin point 111, which is a central point with respect to aft frame 92.

Figure 5:
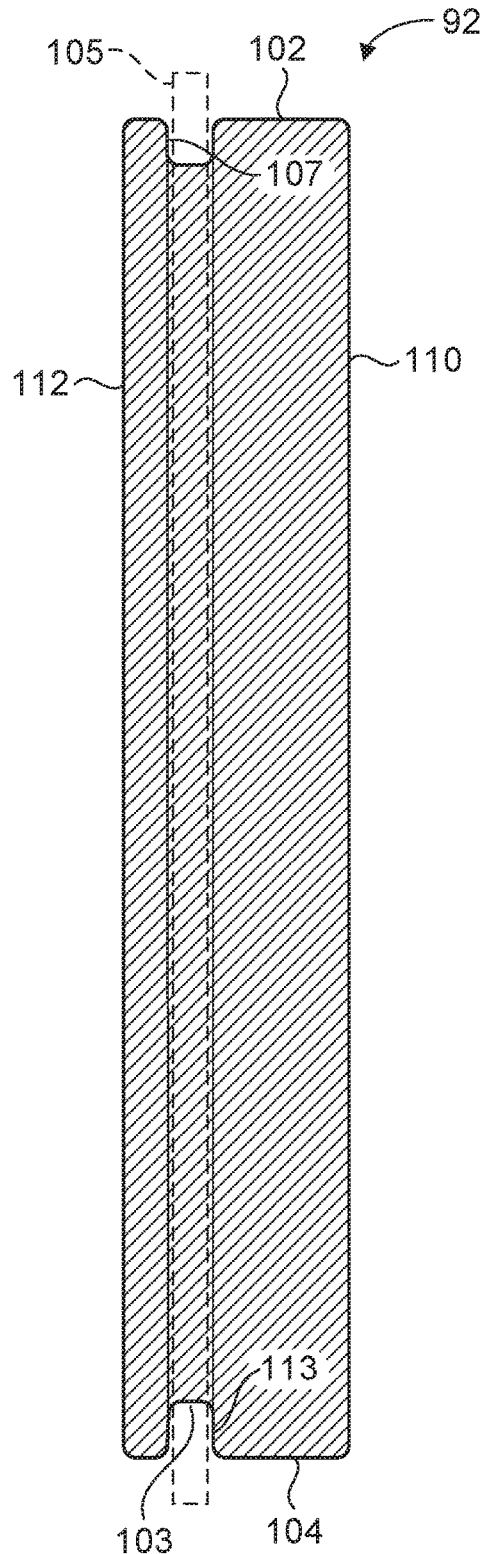
FIG. 5 illustrates a side view of the aft frame, according to an aspect of the present disclosure.

FIG. 5 illustrates a simplified, side view of the aft frame, according to an aspect of the present disclosure. A seal slot 103 extends circumferentially around the aft frame 92, and a seal 105 (shown in phantom) is placed in the seal slot 103. The seal slot 103 forms a groove or slot in the main body 100. The seal 105 may be paired with a wear shim (not shown), that also fits inside seal slot 103. The seal slot includes an upstream facing surface 107 and a downstream facing surface 113, and a radially outer facing surface (i.e., the bottom of the groove/slot). A gap exists between the upstream facing surface 107 of the seal slot 103 and the opposing surface of the seal 105. This gap will be used to assist in cooling of the aft frame and the space between neighboring aft frames.

Figure 6:
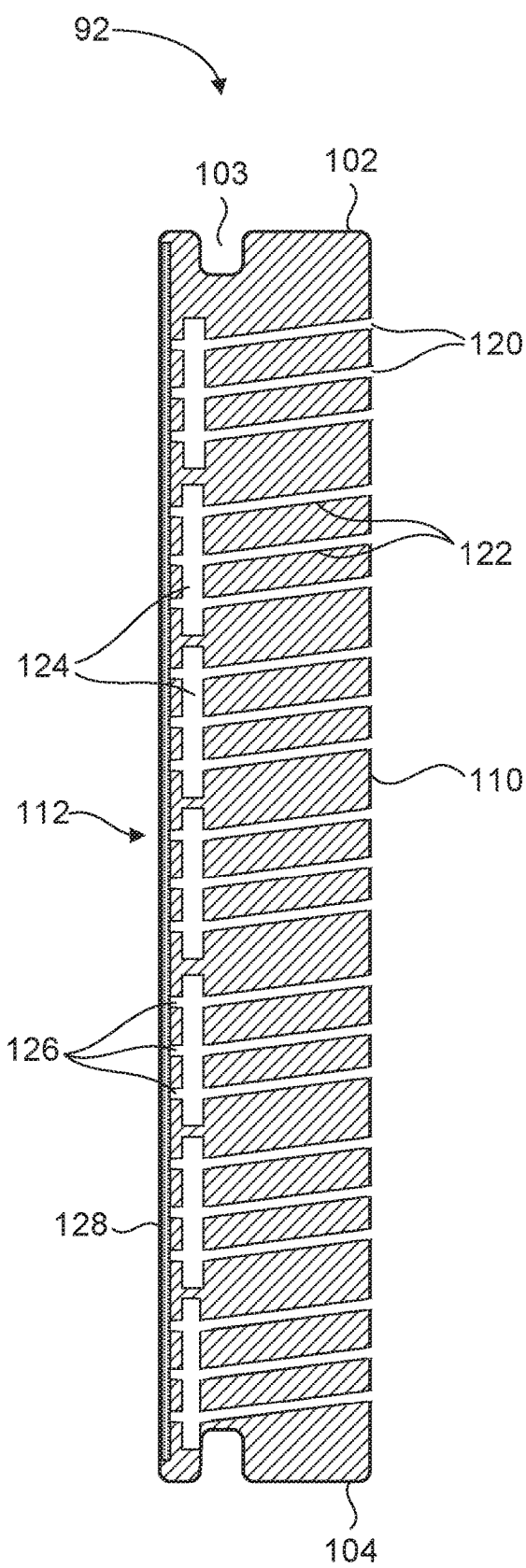
FIG. 6 illustrates a side, cross-sectional view of the aft frame, according to an aspect of the present disclosure.

FIG. 6 illustrates a side, cross-sectional view of the aft frame 92, according to an aspect of the present disclosure. The feed hole inlets 120 are located on the upstream facing surface 110, and each of the feed hole inlets is connected to a cooling channel 122. The cooling channels 122 pass through the main body 100 of the aft frame and extend towards the downstream surface 112. The cooling channels 122 may pass straight or axially through the main body, or may be angled with respect to an axial line passing through central origin point 111. The term "axial" is with reference to the aft frame and is generally in the direction of the flow of combustion gasses, or in other words, into the page of FIG. 4 or right to left in FIGS. 5 and 6. The term "radial" is any direction at right angles to the axial direction. The cooling channels 122 are connected to and terminate (or exhaust into) plenums 124. Each cooling channel 122 is connected to one plenum 124, and one plenum is connected to multiple cooling channels 122. Each plenum 124 has multiple "inputs" from a plurality (i.e., two or more) of cooling channels 122. This configuration is advantageous, because it minimizes or reduces the adverse effects of clogging of the cooling channels. If one cooling channel becomes clogged (or otherwise obstructed) the other cooling channels feeding the same plenum will continue to provide cooling airflow to the plenum.

Each plenum 124 is connected to a plurality of microchannels 126. The microchannels 126 are formed in or near the downstream facing surface 112, and extend outward toward (but not to) the radially outer surfaces. The microchannels 126 may have depths in the range from approximately 0.2 millimeters (mm) to approximately 3 mm, or 0.5 mm to 1 mm, or any subranges therebetween. Further, the microchannels 126 may have widths in the range from approximately 0.2 mm to approximately 3 mm, or 0.5 mm to 1 mm, or any subranges therebetween. The length of each microchannel 126 will vary based on the distance from the plenum to the end point of the microchannel. The microchannels 126 may be covered by a cover member 128, such as pre-sintered preform, sheet metal or additively manufactured (3-D printed) member that is brazed or diffusion-bonded to the main body 100.

If the cover member 128 is a pre-sintered preform, the base alloy of the pre-sintered preform can comprise any composition such as one similar to the main body 100 to promote common physical properties between the pre-sintered preform and the main body 100. For example, in some embodiments, the base alloy and the main body share a common composition (i.e., they are the same type of material). In some embodiments, the base alloy can comprise a superalloy, a nickel-based superalloy or a cobalt-based superalloy. In some embodiments, the properties for the base alloy include chemical and metallurgical compatibility with the main body 100.

Figure 7:
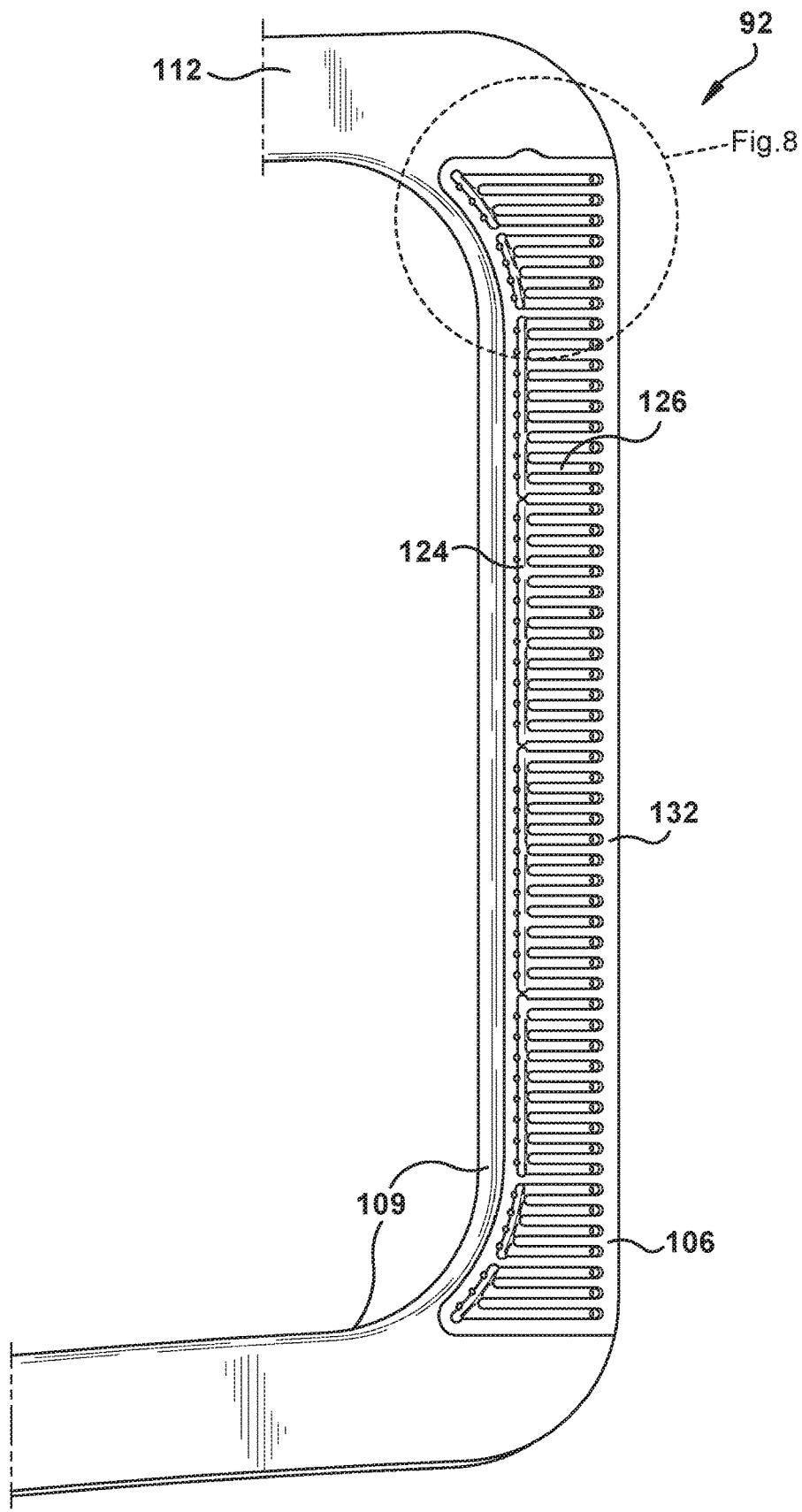
FIG. 7 illustrates a partial, end view of the downstream side of the aft frame, according to an aspect of the present disclosure.
Figure 8:
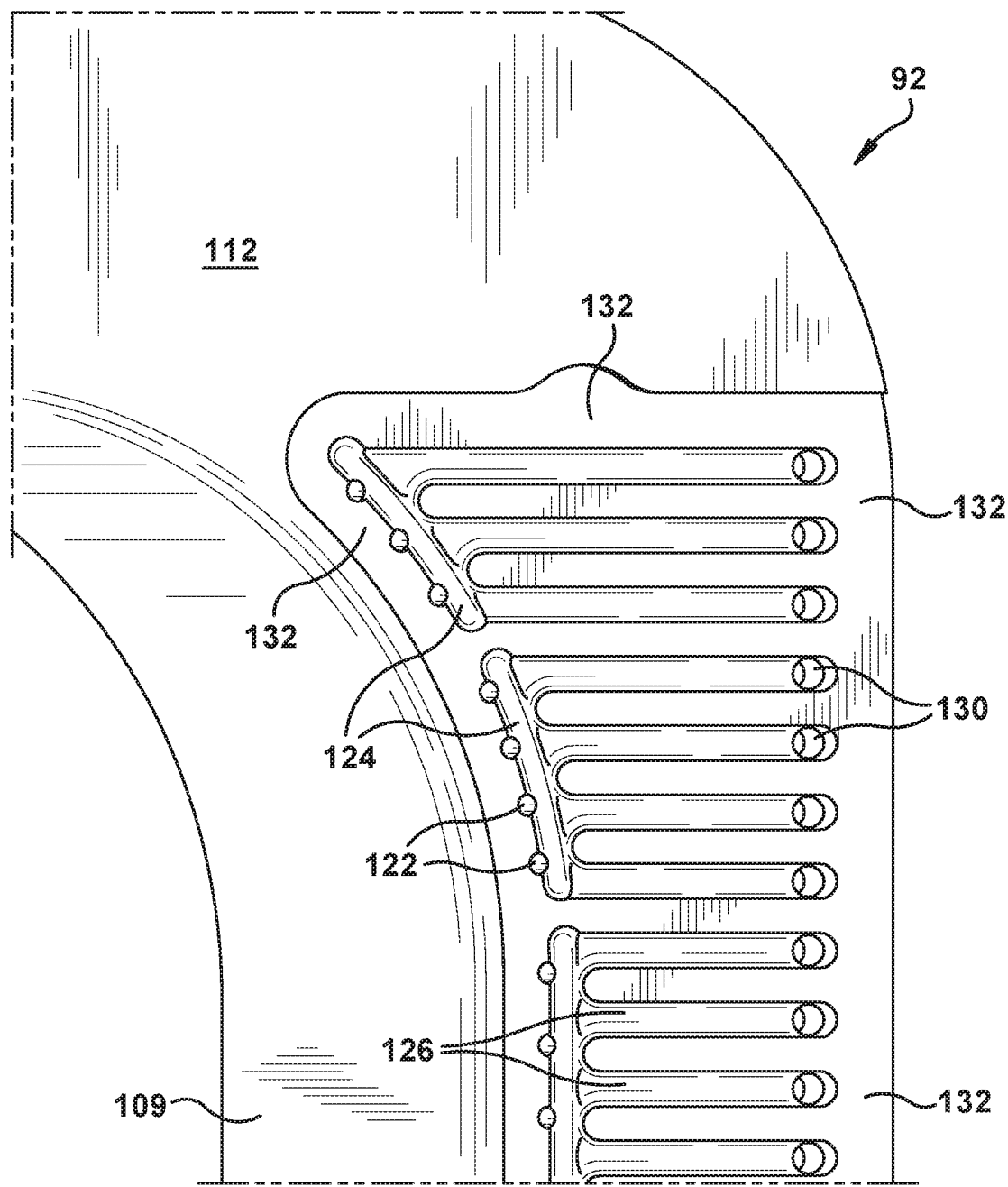
FIG. 8 illustrates an enlarged view of the upper right portion of FIG. 7, according to an aspect of the present disclosure.

FIG. 7 illustrates a partial, end view of the downstream side of the aft frame 92, and FIG. 8 illustrates an enlarged view of the upper right portion of FIG. 7, according to an aspect of the present disclosure. The cover member 128 is omitted for clarity. The cooling channels 122 are shown terminating in plenums 124. The microchannels 126 extend from the plenums 124 toward the outer radial surfaces (e.g., 102, 106) of the aft frame, but terminate before the outer radial surfaces into exit channels 130 where the cooling air is then discharged into the seal slot 103 out of the upstream facing surface 107. The exit channels 130 begin at the outer radial end of the microchannels 126, and extend axially back (in the upstream direction) to the seal slot 103. Each plenum 124 may have two or more cooling channels 122 as inputs. Each plenum may also have two or more microchannels as outputs thereof. With this configuration, obstruction of any one input (or output) will not cut off cooling flow to the plenum and any un-obstructed input or output cooling channels/slots. This prevents any one area of the aft frame from overheating due to obstructed cooling holes, cooling channels or microchannel cooling slots. Furthermore, the microchannel cooling slots 126 may be configured to be straight, curved or serpentine, to obtain the desired degree of cooling of the aft frame.

A land 132 is formed around the perimeter of the plenums 124 and microchannels 126. The land 132 is an area that is recessed into upstream facing surface 112, but land 132 is not formed as deep as plenums 124 and microchannels 126. The land 132 provides a good bonding surface for the cover member 128, and the surface area provided by land 132 yields excellent bonding results between the surface of land 132 and the cover member 128. As one example only, the depth of land 132 is selected to be about the same depth (or thickness) as the cover member 128.

Figure 9:
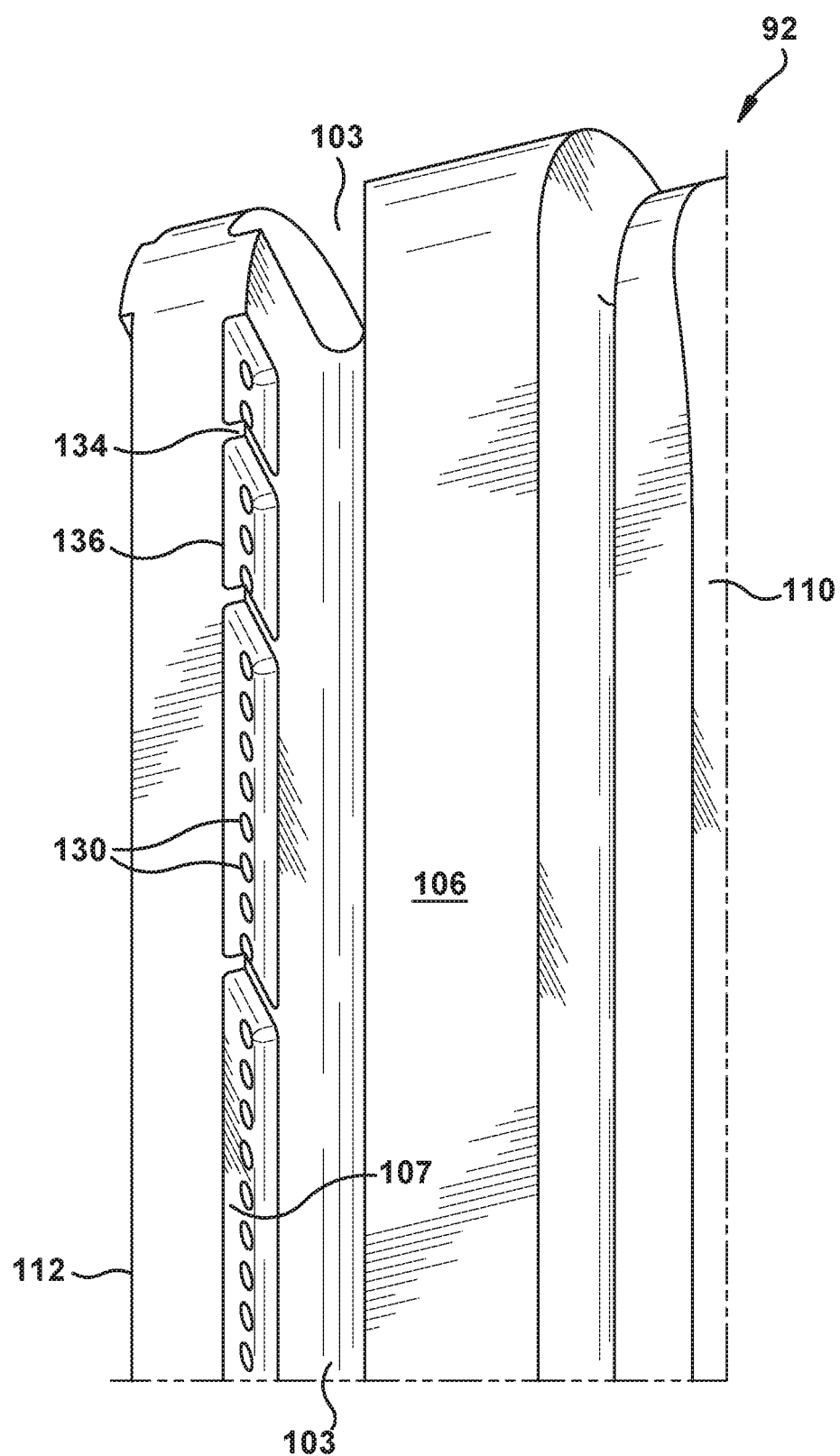
FIG. 9 illustrates a partial, side view of the aft frame showing the exit channels exhausting from an upstream facing surface of the seal slot, according to an aspect of the present disclosure.

FIG. 9 illustrates a partial, side view of the aft frame 92, according to an aspect of the present disclosure. The exit channels 130 are shown exiting on the upstream facing surface 107 of the seal slot 103. For example, the exit channels 130 begin on the downstream facing surface 112 and in a substantially straight path extend to upstream facing surface 107 of the seal slot 103. The seal is omitted for clarity. The slot 103 includes a plurality of spacers 134 and a plurality of recesses 136. The seal 105 will abut the top of the spacers 134, and this creates a cavity between the seal 105 and the bottom of each recess 136. The recesses 136 permit the cooling air to exhaust from the sides of the aft frame 92, and cool the regions between adjacent aft frames and transition pieces.

The microchannels 126 and exit channels 130 may extend along one or both sides of the aft frame, and may also extend along the top and/or bottom of the aft frame. The specific location of the microchannels and exit channels will be selected based on cooling needs of the aft frame and thermal gradient reduction objectives.

Figure 10:
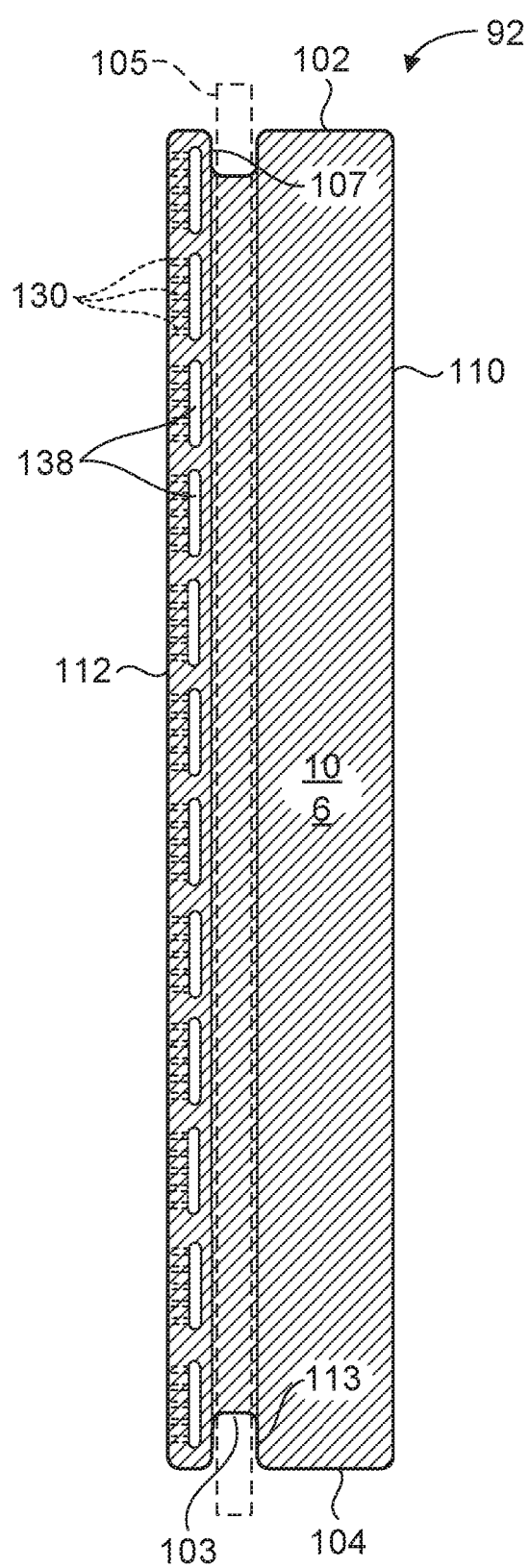
FIG. 10 illustrates a side view of the aft frame where the aft frame includes exhaust slots on the side rails thereof, according to an aspect of the present disclosure.

FIG. 10 illustrates a side view of the aft frame 92 where the aft frame includes exhaust slots 138 on the side rails thereof, according to an aspect of the present disclosure. As an alternative to the recesses and spacers shown in FIG. 9, a series of exhaust slots 138 may be formed into the side rails 106 (as shown) and 108, and/or the outer/top rail 102 and the inner/bottom rail 104. The exit channels 130 terminate in these exhaust slots 138, with the resulting cooling air being exhausted out of the exhaust slots 138. This configuration will directly cool the spaces between neighboring aft frames. In this embodiment, the seal slot 103 is not modified, but the side rails 106 and 108 are machined to include the exhaust slots 138. The cooling flow is similar to previous embodiments, in that flow begins at feed hole inlets 120, travels along cooling channels 122 to plenums 124 and then microchannels 126 and then back through exit channels 130. The only difference is that exit channels 130 exhaust into exhaust slots 138, without having the cooling airflow continue on to seal slot 103.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An aft frame assembly for a gas turbine transition piece, the aft frame assembly comprising:
    a main body comprising an upstream facing surface, a downstream facing surface and a seal slot;
    a plurality of feed hole inlets located on the upstream facing surface, each of the feed hole inlets coupled to one of a plurality of cooling channels passing through the main body towards the downstream facing surface;
    a plurality of plenums located in or near the downstream facing surface, each of the plurality of cooling channels connected to and terminating in at least one of the plenums, the cooling channels are configured as inputs to the plenums;
a plurality of microchannels formed in or near the downstream facing surface, each of the plurality of microchannels connected to one of the plenums, two or more of the cooling channels and two or more of the microchannels are connected to one of the plenums, and the microchannels are configured as outputs of the plenums; and
a plurality of exit channels connected to the microchannels, the exit channels are configured to exhaust flow out of an upstream facing surface of the seal slot or exhaust flow out of one or more exhaust slots formed in a side rail of the aft frame assembly.

2. The aft frame assembly of claim 1, wherein at least a portion of the plurality of microchannels are covered by a cover member comprising:
a pre-sintered preform, or sheet metal, or an additively manufactured member.

3. The aft frame assembly of claim 2, the downstream facing surface having a land disposed at an outer radial end of the microchannels, the land configured for bonding with the cover member.

4. The aft frame assembly of claim 2, the downstream facing surface having a land disposed around a perimeter of the plenums and the microchannels, the land configured for bonding with the cover member.

5. The aft frame assembly of claim 2, the upstream facing surface of the seal slot comprising a series of spacers and recesses, the exit channels exhausting flow into the recesses.

6. The aft frame assembly of claim 2, wherein the microchannels are located on sides of the aft frame assembly.

7. The aft frame assembly of claim 2, wherein the exit channels exhaust flow out of an upstream facing surface of a seal slot and subsequently out of a side rail of the aft frame assembly.

8. A transition piece assembly having an aft frame assembly, the aft frame assembly comprising:
a main body comprising an upstream facing surface, a downstream facing surface and a seal slot;
a plurality of feed hole inlets located on the upstream facing surface, each of the feed hole inlets coupled to one of a plurality of cooling channels passing through the main body towards the downstream facing surface;
a plurality of plenums located in or near the downstream facing surface, each of the plurality of cooling channels connected to and terminating in at least one of the plenums, the cooling channels are configured as inputs to the plenums;
a plurality of microchannels formed in or near the downstream facing surface, each of the plurality of microchannels connected to one of the plenums, two or more of the cooling channels and two or more of the microchannels are connected to one of the plenums, and the microchannels are configured as outputs of the plenums; and
a plurality of exit channels connected to the microchannels, the exit channels are configured to exhaust flow out of an upstream facing surface of the seal slot or exhaust flow out of one or more exhaust slots formed in a side rail of the aft frame assembly.

9. The aft frame assembly of claim 8, wherein at least a portion of the plurality of microchannels are covered by a cover member comprising:
a pre-sintered preform, or sheet metal, or an additively manufactured member.

10. The transition piece assembly of claim 9, the downstream facing surface having a land disposed at an outer radial end of the microchannels, the land configured for bonding with the cover member.

11. The transition piece assembly of claim 9, the downstream facing surface having a land disposed around a perimeter of the plenums and the microchannels, the land configured for bonding with the cover member.

12. The transition piece assembly of claim 11, the upstream facing surface of the seal slot comprising a series of spacers and recesses, the exit channels exhausting flow into the recesses.

13. The transition piece assembly of claim 12, wherein the microchannels are located on sides of the aft frame assembly.

14. The transition piece assembly of claim 12, wherein the exit channels exhaust flow out of an upstream facing surface of a seal slot and subsequently out of a side rail of the aft frame assembly.

15. A gas turbine comprising:
a compressor;
a combustion section disposed downstream from the compressor, the combustion section being in fluid communication with the compressor;
a turbine disposed downstream from the combustion section;
the combustion section comprising an aft frame assembly having a main body comprising an upstream facing surface, a downstream facing surface and a seal slot;
a plurality of feed hole inlets located on the upstream facing surface, each of the feed hole inlets coupled to one of a plurality of cooling channels passing through the main body towards the downstream facing surface;
a plurality of plenums located in or near the downstream facing surface, each of the plurality of cooling channels connected to and terminating in at least one of the plenums, the cooling channels are configured as inputs to the plenums;
a plurality of microchannels formed in or near the downstream facing surface, each of the plurality of microchannels connected to one of the plenums, two or more of the cooling channels and two or more of the microchannels are connected to one of the plenums, and the microchannels are configured as outputs of the plenums;
a plurality of exit channels connected to the microchannels, the exit channels are configured to exhaust flow out of an upstream facing surface of the seal slot or exhaust flow out of one or more exhaust slots formed in a side rail of the aft frame assembly; and
wherein at least a portion of the plurality of microchannels are covered by a cover member comprising a pre-sintered preform, or sheet metal, or an additively manufactured member.

16. The gas turbine of claim 15, the downstream facing surface having a land disposed at an outer radial end of the microchannels, the land configured for bonding with the cover member.

17. The gas turbine of claim 15, the downstream facing surface having a land disposed around a perimeter of the plenums and the microchannels, the land configured for bonding with the cover member.

18. The gas turbine of claim 17, the upstream facing surface of the seal slot comprising a series of spacers and recesses, the exit channels exhausting flow into the recesses.

19. The gas turbine of claim 17, wherein the microchannels are located on sides of the aft frame assembly.

20. The gas turbine of claim 17, wherein the exit channels exhaust flow out of an upstream facing surface of a seal slot and subsequently out of a side rail of the aft frame assembly.

* * * * *